(12) United States Patent
Curotto

(10) Patent No.: US 8,330,059 B2
(45) Date of Patent: *Dec. 11, 2012

(54) AUTOMATED COLLECTION AND SCALE SYSTEM

(75) Inventor: John Michael Curotto, Sonoma, CA (US)

(73) Assignee: The Curotto-Can, Inc., Sonoma, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 12/688,660

(22) Filed: Jan. 15, 2010

(65) Prior Publication Data

US 2010/0179912 A1    Jul. 15, 2010

Related U.S. Application Data

(60) Provisional application No. 61/144,989, filed on Jan. 15, 2009, provisional application No. 61/153,845, filed on Feb. 19, 2009.

(51) Int. Cl.
*G01G 19/00* (2006.01)

(52) U.S. Cl. ........ 177/136; 700/305; 177/141; 177/245; 340/666; 702/173; 705/414

(58) Field of Classification Search .................. 177/136, 177/141, 245; 700/305; 702/173, 174; 705/414; 340/666
See application file for complete search history.

(56) References Cited

U.S. PATENT DOCUMENTS

| | | | | |
|---|---|---|---|---|
| 2,069,499 | A * | 2/1937 | Marin et al. | 177/238 |
| 3,321,036 | A * | 5/1967 | Keenan et al. | 177/245 |
| 5,119,894 | A * | 6/1992 | Crawford et al. | 177/145 |
| 5,209,312 | A * | 5/1993 | Jensen | 177/136 |
| 5,230,393 | A * | 7/1993 | Mezey | 177/139 |
| 5,565,846 | A * | 10/1996 | Geiszler et al. | 340/572.2 |
| 5,641,947 | A * | 6/1997 | Riddle, Jr. | 177/126 |
| 5,837,945 | A * | 11/1998 | Cornwell et al. | 177/136 |
| 6,191,691 | B1 * | 2/2001 | Serrault | 340/572.8 |
| 6,687,656 | B2 * | 2/2004 | Durbin et al. | 702/188 |
| 7,146,294 | B1 * | 12/2006 | Waitkus, Jr. | 702/188 |
| 7,151,231 | B2 * | 12/2006 | Kamakau | 177/126 |
| 7,737,372 | B2 * | 6/2010 | Dougherty et al. | 177/245 |
| 7,897,884 | B2 * | 3/2011 | Harish | 177/25.13 |
| 2006/0127202 | A1 * | 6/2006 | Tryggvason | 414/21 |
| 2007/0278019 | A1 * | 12/2007 | Santi et al. | 177/136 |
| 2010/0206642 | A1 * | 8/2010 | Curotto | 177/1 |

OTHER PUBLICATIONS

Curotto Scale System Project, Dec. 1, 2008, 12 pages.

* cited by examiner

*Primary Examiner* — Randy W Gibson
(74) *Attorney, Agent, or Firm* — Merchant & Gould, P.C.

(57) ABSTRACT

The disclosure describes a novel approach of utilizing a collection bin for a front loading waste collection vehicle. The collection bin includes a weighing system with a processor for measuring the weights of material collected from each waste container and associating this weight with appropriate data, such as the owner of the waste container.

18 Claims, 16 Drawing Sheets

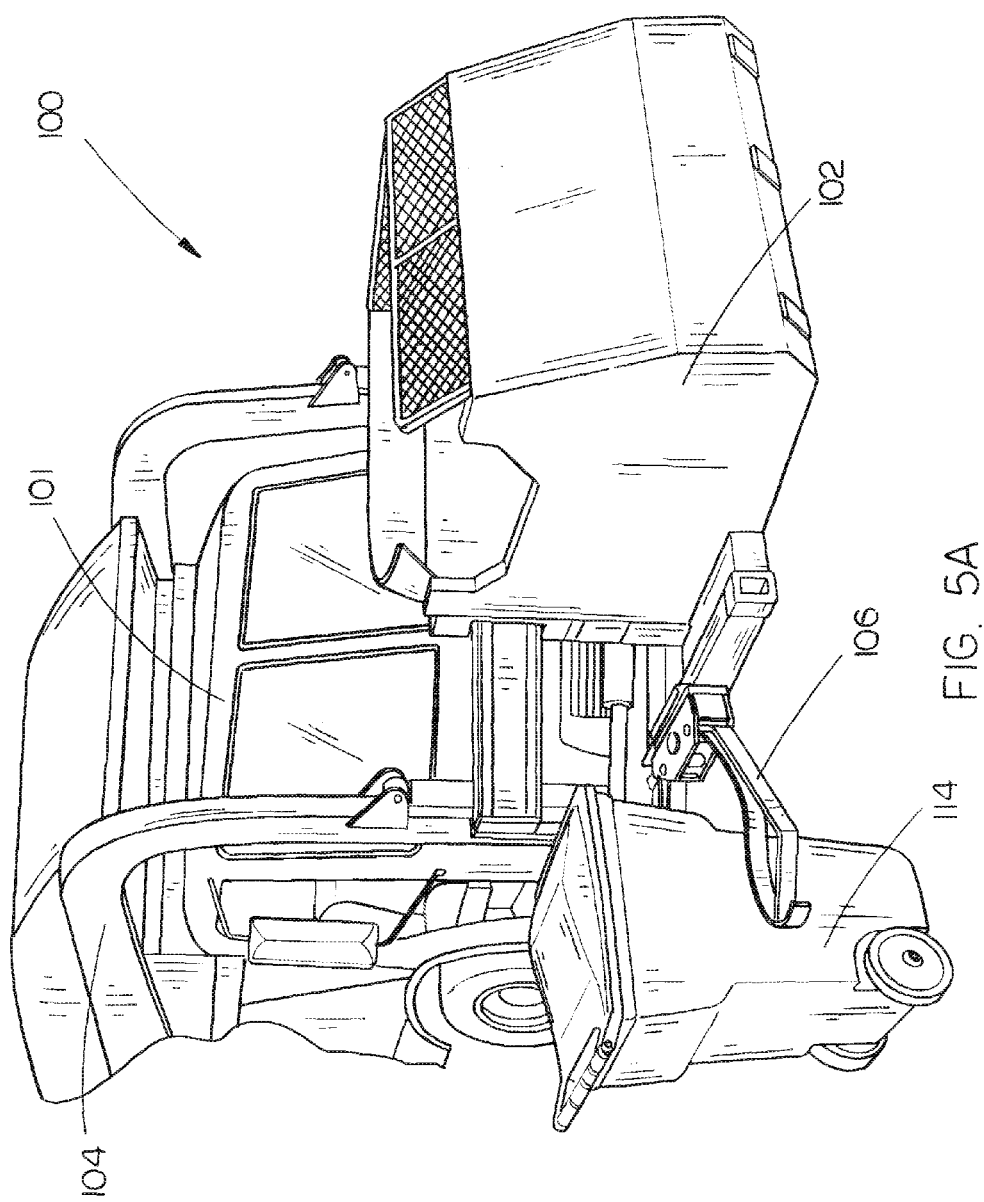

AUTOMATED COLLECTION AND SCALE SYSTEM

RELATED APPLICATIONS

This application claims the benefit of U.S. Provisional Application No. 61/144,989, filed Jan. 15, 2009, and entitled, "Automated Collection and Scale System", which application is hereby incorporated herein by reference. Further, this application claims the benefit of U.S. Provisional Application No. 61/153,845, filed Feb. 19, 2009, and entitled, "Automated Collection and Scale System", which application is hereby incorporated herein by reference.

BACKGROUND

Several types of waste collection vehicles exist. Waste collection vehicles can be front loaders, rear loaders, automated side loaders, and grapple trucks. Waste collection vehicles are typically utilized to pick up quantities of waste for hauling to a determined area, such as a landfill, transfer station, or material recovery facility. Waste collection vehicles can be further utilized or modified to collect recyclables for transport to a recycling facility.

The allocation of waste removal equipment has been improved by the use of large trucks having compaction capabilities extending their effective range and capacity between unloadings. Further, the vehicles may include specialized hoists to lift trash containers into the truck.

As the amount of solid waste, such as municipal solid waste, generated in the United States increases and landfill capacity diminishes, efficient recycling becomes of critical importance. In many communities, recyclable waste amounts to 60-70% of the total waste collected.

SUMMARY

The disclosure describes a novel approach of utilizing a collection bin for a front loading waste collection vehicle. The collection bin includes a weighing system with a processor for measuring the weights of material collected from each waste container and associating this weight with appropriate data, such as the owner of the waste container.

In part, this disclosure describes a method for weighing materials in a collection bin for a front loading waste collection vehicle. The method includes performing the following steps:
a) identifies a waste container;
b) moving materials stored in the identified waste container to a collection bin;
c) determining that the materials have been received by the collection bin;
d) weighing the materials in the collection bin to produce a weight measurement with an accuracy of within about 5 pounds or less; and
e) utilizing a processor to associate the weight measurement with the identified waste container.

In another aspect, this disclosure describes a collection bin that includes: at least one pocket for receiving at least one fork of a fork assembly of a front loading waste collection vehicle; a processor, and a weighing instrument controlled by the processor, the weighing instrument is adapted to weigh material disposed in the collection bin to produce weight measurements. The processor associates the weight measurements with appropriate data.

Yet another aspect of this disclosure describes a collection and scale system that includes: a front loading waste collection vehicle; and a collection bin. The collection bin includes: at least one pocket for receiving at least one fork of a fork assembly of the front loading waste collection vehicle; a processor, and a weighing instrument controlled by the processor, the weighing instrument is adapted to weigh material disposed in the collection bin to produce weight measurements. The processor associates the weight measurements with appropriate data.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the claimed invention.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

FIG. 5A-5C are perspective views of one embodiment of a collection and scale system showing the lifting and emptying of a waste container according to the principles of the present disclosure;

DETAILED DESCRIPTION

Figure 1:
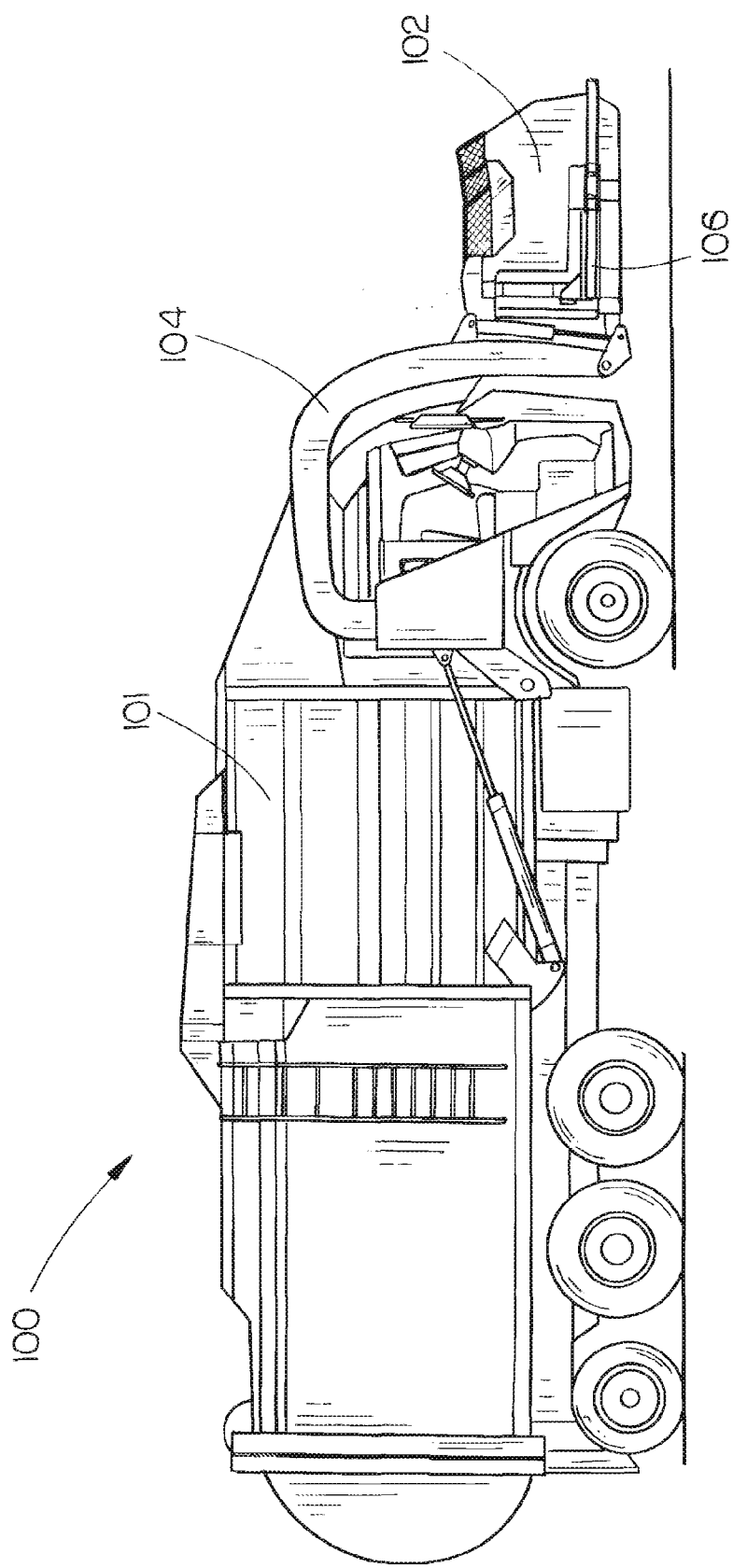
FIG. 1 is a side view of one embodiment of a collection and scale system according to the principles of the present disclosure.
Figure 2:
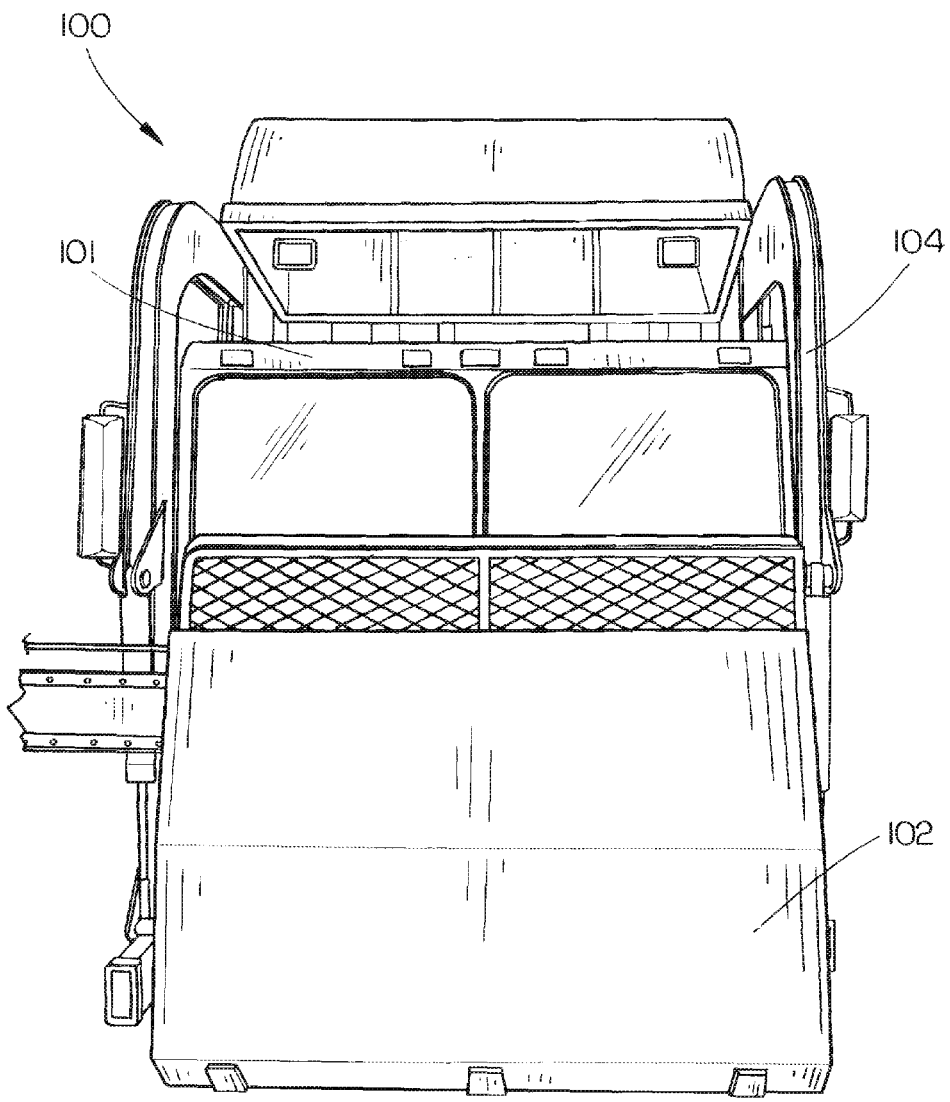
FIG. 2 is a front view of one embodiment of a collection and scale system according to the principles of the present disclosure.

Although the techniques introduced above and discussed in detail below may be implemented in a variety of collection vehicles, the present disclosure will discuss the implementation of these techniques in the context of a collection vehicle for use in providing removal and transport of recyclables. The reader will understand that the technology described in the context of a scaling system for a collection vehicle could be adapted for use with other systems or vehicles.

Collection vehicles are used to provide removal and transport of items such as municipal solid waste, recyclables, dirt, rock, coal, minerals, green waste (e.g. yard waste), and/or any other material commonly collected and transported. While operating a collection vehicle, it is desirable to monitor the amount of materials collected. Accordingly, a collection vehicle with a scale system is desirable.

A collection and scale system (CS system) comprises a collection bin, a weighing system, and a front loading waste collection vehicle. In one embodiment, the CS system further comprises an automated robotic arm. The CS system may provide accurate weight measurements of within 5 pounds (2.268 kilograms) or less of collected materials per waste container, per filled collection bin, per customer, and/or per route. The CS system may provide accurate weight measurements of within 0.5 pounds (0.227 kilograms) or less of collected materials per waste container, per filled collection bin, per customer, and/or per route. The CS system may provide accurate weight measurements of within 0.1 pounds (0.0454 kilograms) or less of collected materials per waste container, per filled collection bin, per customer, and/or per route. Additionally, the CS system may provide an accurate weight of the materials collected in total by the weight collection vehicle. Further, the design of the CS system allows for identification and removal of undesirable/improper materials from the collection bin and for weight recalculation after the removal of undesirable materials from the collection bin.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the scope of the equipment and methods described herein.

Reference will now be made in detail to various features of the present disclosure that are illustrated in the accompanying drawings. Wherever possible, the same reference numbers will be used throughout the drawings to refer to the same or like parts.

FIGS. 1, 2, 5A, 5B, 5C, 6, 7, and 9 illustrate embodiments of a collection and scale system (CS system) 100. The CS system 100 illustrated comprises a front loading waste collection vehicle 101, a collection bin 102, and a weighing system. In one embodiment, the CS system 100 further comprises an automated robotic arm 106. The CS system 100 may provide accurate weight measurements of within 5 pounds (2.268 kilograms) or less of the materials contained within each waste container, discarded per customer, filled in the collection bin 102, and collected over an entire route, collected in total per truck, or collected in total by selected waste collection vehicles in any desired amount of time. The CS system 100 may provide accurate weight measurements of within 0.5 pounds (0.2268 kilograms) or less of the materials contained within each waste container, discarded per customer, filled in the collection bin 102, and collected over an entire route, collected in total per truck, or collected in total by selected waste collection vehicles in any desired amount of time. The CS system 100 may provide accurate weight measurements of within 0.1 pounds (0.0454 kilograms) or less of the materials contained within each waste container, discarded per customer, filled in the collection bin 102, and collected over an entire route, collected in total per truck, or collected in total by selected waste collection vehicles in any desired amount of time. The materials collected may be waste, such as municipal solid waste, recyclables, dirt, rock, coal, minerals, green waste (e.g. yard waste), or any other material commonly collected and transported. As utilized herein, the term "recyclables" is not limiting and is understood to be interchangeable with any other material that is commonly collected and transported.

As the amount of solid waste generated in the United States increases and landfill capacity diminishes, efficient recycling becomes of critical importance. As recycling increases in importance, so does the system for collecting and transporting recyclables. In some areas, in order to encourage individuals to recycle, incentive programs have developed that provide each consumer with rewards based on the amount of recycling he or she does. The CS system 100 is an ideal tool for collecting recyclables that allows for accurate determinations of recycling amounts per customer, household, or area. Further, current collection and transport vehicles charge by volume regardless of the amount of materials collected. The collection and scale system (CS system) 100 allows an operator to charge by weight of the material collected.

As illustrated the front loading waste collection vehicle (WCV) 101 comprises a vehicle that includes a hopper, and a fork assembly 104. In one embodiment, the fork assembly 104 is referred to as automated because the attachment to the commercial waste container and/or the movement of the fork assembly 104 is automated or partially automated. In one embodiment, the hopper may include a packing blade. Front loading WCVs 101 are typically equipped with fork assemblies 104 on the front end of the vehicle. The fork assemblies 104 are designed to engage standardized commercial waste containers (e.g. dumpsters). The forks of the fork assembly 104 are aligned with and inserted into pockets provided on the commercial waste containers. The fork assembly 104 then lifts the commercial waste container over the cab of the vehicle and dumps the material into the hopper of the vehicle.

Figure 8:
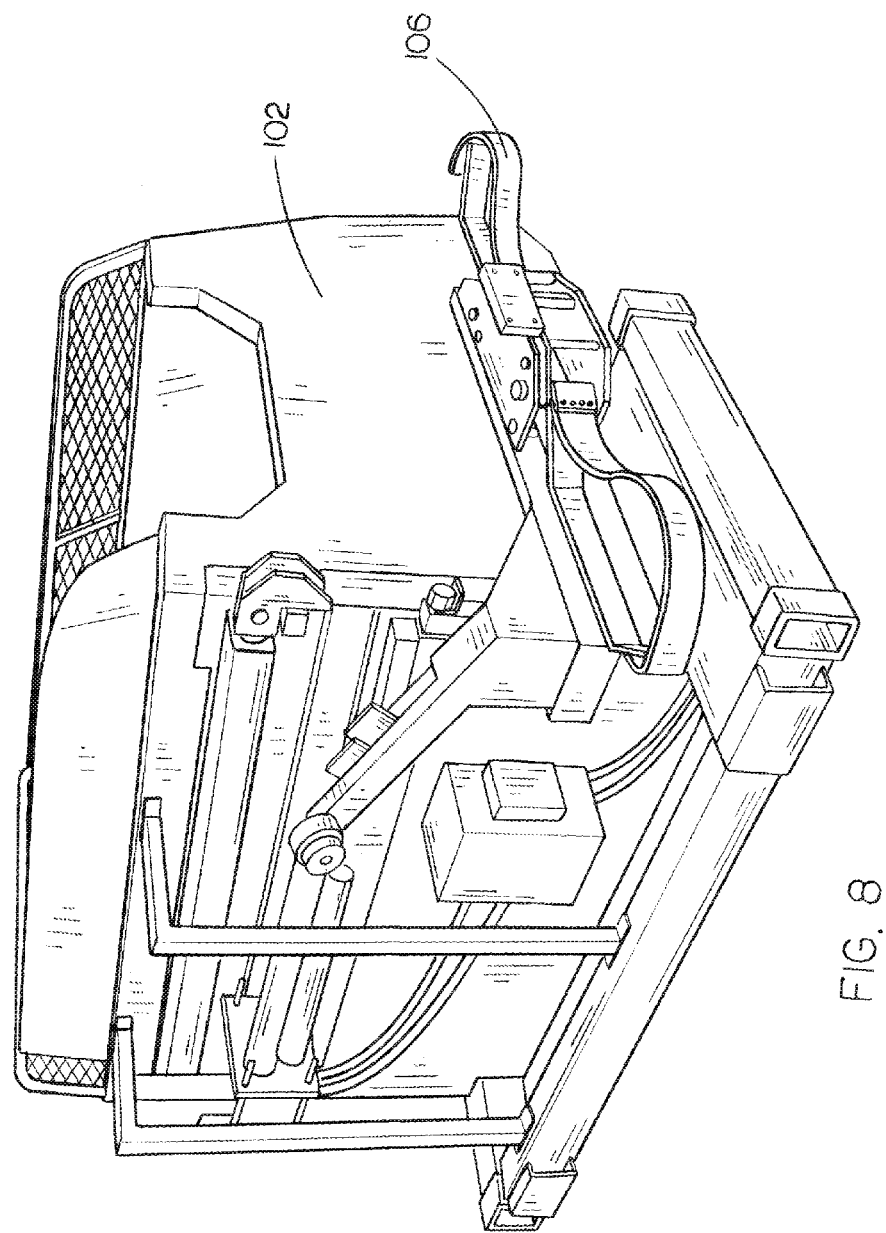
FIG. 8 is a perspective view of one embodiment of a collection bin according to the principles of the present disclosure.

The collection bin 102 (or intermediate bin) of the CS system 100 includes at least one pocket on the collection bin 102. A pocket is any suitable method for attaching a collection bin 102 to the fork assembly 104 of a front loading WCV 101. As illustrated in FIGS. 1, 5A, and 8, in one embodiment, pockets are openings that align with the forks of the fork assembly 104 of the front loading WCV 101. The collection bin 102 allows any front loading WCV 101 to be adapted to perform waste/material removal from non-commercial waste containers 114 or smaller waste containers 114. Further, the weighing system allows the collected materials to be weighed and the weights associated with specific or appropriate information.

Figure 14:
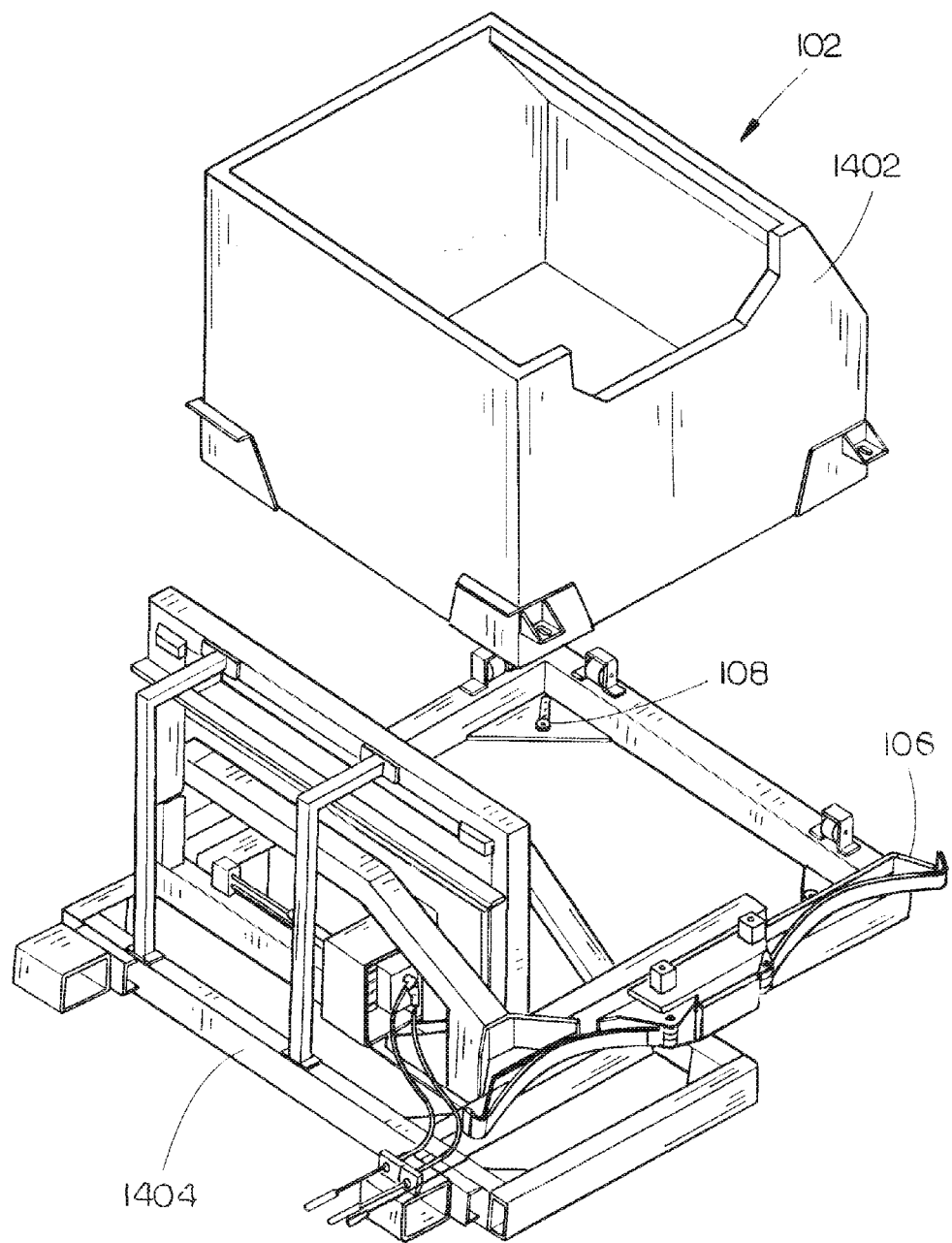
FIG. 14 is an exploded view of one embodiment of a collection bin.

In one embodiment, the collection bin 102 is a solitary structure. In an alternative embodiment, the collection bin 102 is structured in multiple parts. In one embodiment, the collection bin 102 has substantially two parts. In another embodiment, these two parts are a frame 1404 and a tub 1402 attached to the frame 1404, as illustrated in FIG. 14. As used herein the tub 1402 is any suitable container or holder for holding and/or collecting materials. The frame 1404 as used herein is any suitable device for allowing the tub 1402 to be held by and/or attached to the fork assembly 104 of a front load waste collection vehicle. In one aspect of this embodiment, the two structures may be inseparable once combined. In another aspect of this embodiment, the two structures may be separable from each other even after combination.

In one embodiment, the frame 1404 includes at least one pocket. In this embodiment, two pockets are on the frame 1404, as illustrated in FIG. 14. In another embodiment, a robotic arm 106 is attached to the frame 1404 of the collection bin 102. The frame 1404 allows for one or multiple load cells to be utilized for measuring the weight of the tub 1402, such as two load cells, three load cells, four load cells, six load cells, and eight load cells.

In one embodiment, four load cells are positioned near the corners of the tub 1402 on the frame 1404. The positioning of the load cells underneath the tub 1402 near each corner provide for a level and/or stable weighing surface. This level and/or stable weighing surface provides for a desirable accuracy measurement, such as accuracy of within about 5 pounds or less, within about 1 pound or less, within about 0.5 pounds or less, and within about 0.1 pounds or less.

Further, the utilization of an intermediate or collection bin 102 allows for better accuracy compared to waste collection vehicles with hopper weighing units. Waste collection vehicles with hopper weighing units have to account for extremely large weights totaling up to as much as 40,000 pounds. These large weights drastically decrease the sensitivity and accuracy of the weighing instruments of the hopper. The collection bin 102 does not need to be capable of weighing such large amounts allowing for more desirable accuracy of within about 5 pounds or less, within about 1 pound or less, within about 0.5 pounds or less, and within about 0.1 pounds or less.

Front loading WCVs 101 are typically designed for commercial waste containers, such as dumpsters. Commercial waste containers are typically sized to hold from about 1 cubic yard (about 0.7646 cubic meters) to about 10 cubic yards (about 7.646 cubic meters) of material. Front loaders are not designed for the automated lifting of non-commercial, residential, or smaller sized waste containers 114. Smaller sized waste containers 114 typically hold from about 25 gallons (about 94.64 liters) to about 100 gallons (about 378.5 liters) of material. The collection bin 102 allows any front loading WCV 101 to be adapted to automatically load and empty waste containers 114.

In one embodiment, the collection bin 102 is permanently attached to the fork assembly 104. The collection bin 102 may be attached to the fork assembly 104 by any suitable method, such as welding, bolting, chaining, or soldering. In another embodiment, the collection bin 102 is removable from the fork assembly 104, as illustrated in FIG. 8. The collection bin 102 may be made of any suitable material for holding waste, recyclables or collectable materials, such as plastic, metal, and/or fiberglass. In another embodiment, the collection bin 102 is designed to hold from about 1 cubic yard (about 0.7646 cubic meters) to about 10 cubic yards (about 7.646 cubic meters) of material. In a further embodiment, the collection bin 102 is designed to hold from about 3 cubic yard (about 2.294 cubic meters) to about 5 cubic yards (about 3.823 cubic meters) of material.

Figure 7:
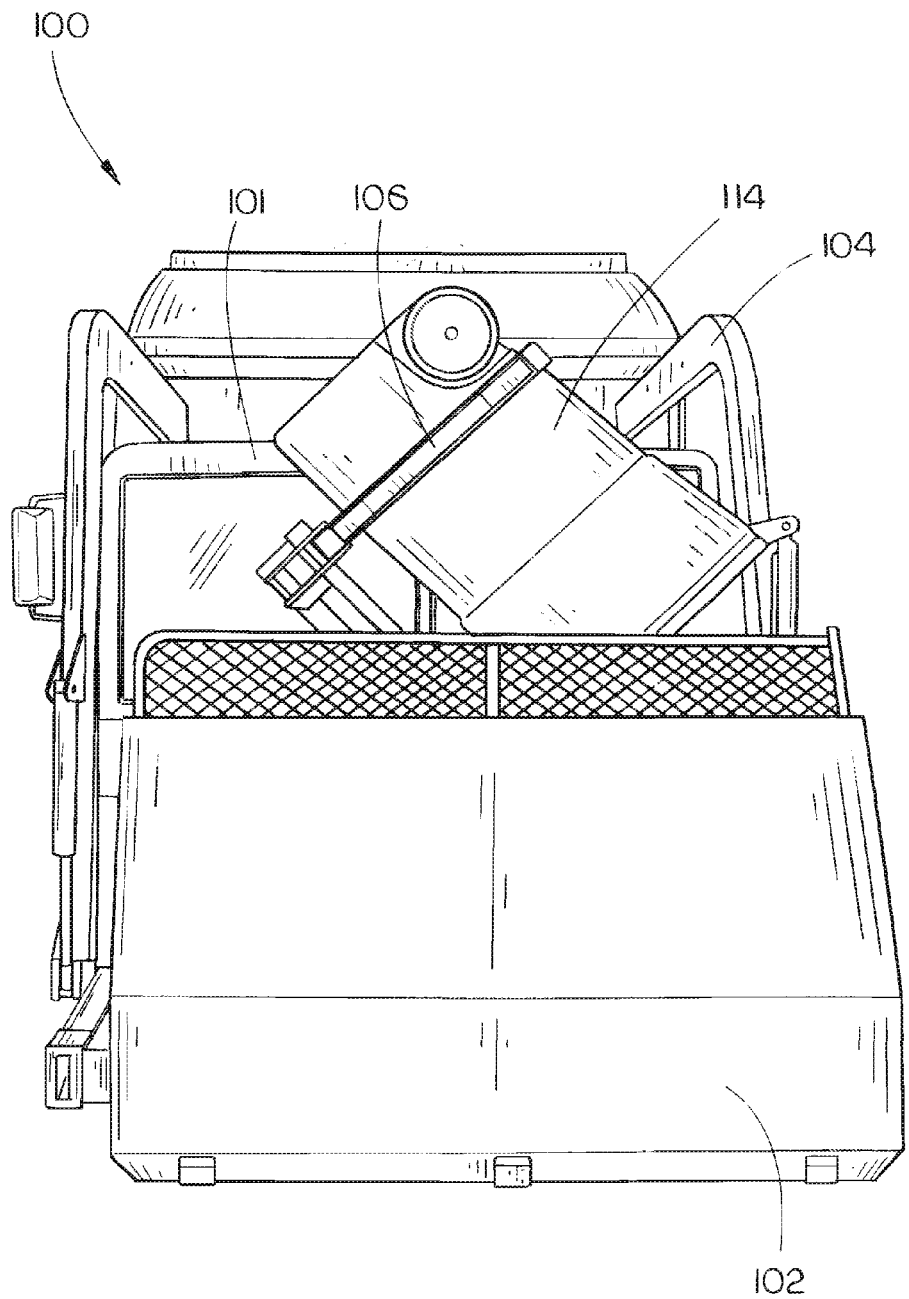
FIG. 7 is a front view of one embodiment of a collection and scale system showing the lifting and emptying of a waste container on a street side of a collection bin according to the principles of the present disclosure.
Figure 9:
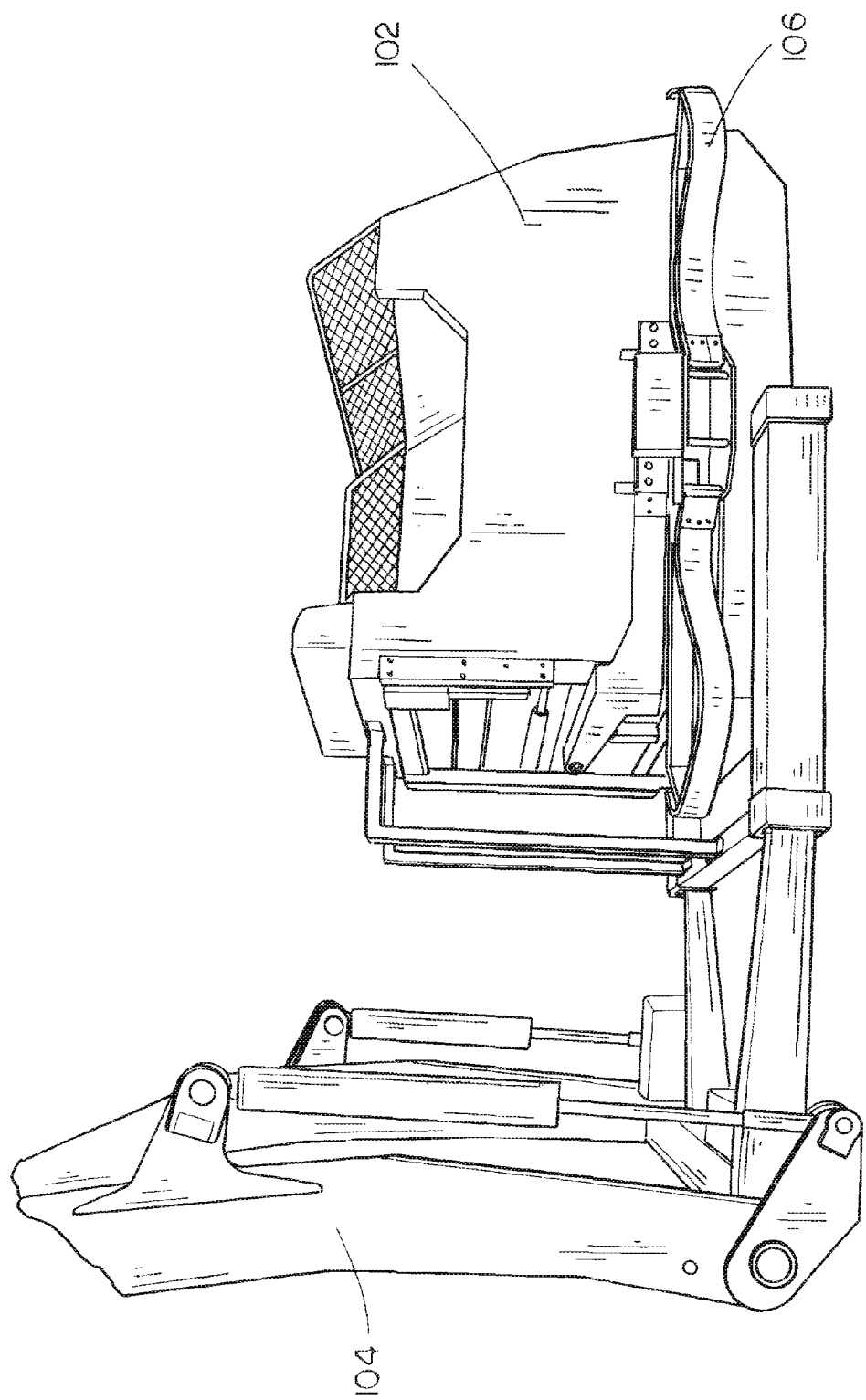
FIG. 9 is a portion side view of one embodiment of a collection and scale system according to the principles of the present disclosure.

In one embodiment, the waste containers 114 are manually lifted and emptied into the collection bin 102. In another embodiment, the waste containers 114 are emptied into a collection bin 102 with a semi-automated cart tipper. In yet another embodiment, the CS system 100 further comprises an automated robotic arm 106 attached to the collection bin 102, as illustrated in FIGS. 8 and 9. The robotic arm 106 is referred to as automated because the grabbing, lifting, dumping, and setting down of the waste container 114 by the robotic arm 106 may be performed automatically upon the initiation of the actions by an operator command. The automated robotic arm 106 may be any suitable robotic arm 106 for the automated grabbing, lifting, and emptying of waste containers 114. The automated robotic arm 106 may be made of any suitable materials for the automated grabbing, lifting, and emptying of waste containers 114, such as plastic, metal, and/or rubber. In one embodiment, the collection bin 102 and/or the robotic arm 106 may be any of the types disclosed in U.S. Pat. No. 7,210,890 filed on Oct. 16, 2003. In one embodiment, the automated robotic arm 106 is powered by utilizing systems already implemented on the front loading WCV 101, such as power, a hydraulic system, or a pneumatic system. In another embodiment, the automated robotic arm 106 is suitable for evenly spreading material dumped from the waste containers 114 in the collection bin 102, as illustrated in FIGS. 7 and 8. In a further embodiment, the automated robotic arm 106 of the front loading WCV 101 is capable of grabbing a waste container 114, picking up and dumping the waste container 114 into the collection bin 102, placing the waste container 114 back on the ground, and releasing the waste container 114 in a time frame of about 4 to 6 seconds. In an additional embodiment, the automated robotic arm 106 grabs, lifts and disposes of any type/shape of waste container 114 or any bulky item, such as furniture, appliances, barrels, or crates with a minimum height of at least 12 inches (30.48 centimeters). In one embodiment, the automated robotic arm 106 picks up waste containers 114 ranging in size from about 30 gallons (about 113.6 liters) to about 400 gallons (about 416.4 liters), as illustrated in FIGS. 5A, 5B, 5C, 6, and 7.

In the embodiment shown, the positioning of the collection bin 102 in front of vehicle allows the occupants in the cab of the vehicle to view the materials being dumped into the collection bin 102. If unwanted materials are disposed in the collection bin 102, the operators can exit the vehicle and remove the unwanted items from the collection bin 102. The viewing of the materials is easily performed during standard operation and allows materials to be removed prior to entering the hopper of the front loading WCV 101. In one embodiment, the hopper of the front loading WCV 101 utilizes a packing blade to compact the collected materials. Because of the packer blade, it is undesirable to manually remove items from the collected materials in the hopper. The collection bin 102, allows undesirable items to be viewed before being placed in the hopper.

The CS system 100 further comprises a weighing system. In one embodiment, the weighing system utilizes a weighing instrument to determine weight measurements. In one embodiment, the weighing instrument includes at least one load cell. In another embodiment, the load is a transducer that utilizes a strain gauge.

In one embodiment, the weighing system utilizes power from the front loading waste collection vehicle 101. In another embodiment, the weighing system utilizes power from its own internal power source, such as a battery or solar panel. In a further embodiment, the weighing system is self-contained. As used herein the term "self-contained" refers to a weighing system that has no connections or at most one connection to the front loading waste collection vehicle 101, such as a power supply connection. Self-contained weighing systems provide for interchangeability between WCVs.

In another embodiment, the weighing system includes a monitor. In one embodiment, the monitor may be located on the WCV. In an alternative embodiment, the monitor may be separate from the WCV. The monitor is capable of displaying information to the operator, such as weight measurements for the associated and/or identified waste containers 114.

In one embodiment the weighing system monitors collection activities in real time. As used herein, "real time" refers to the recording and/or storing of weight measurements as they are taken. In one embodiment, the weight measurements and associated data are sent via a wireless card or network to the computing device in real time.

Figure 13:
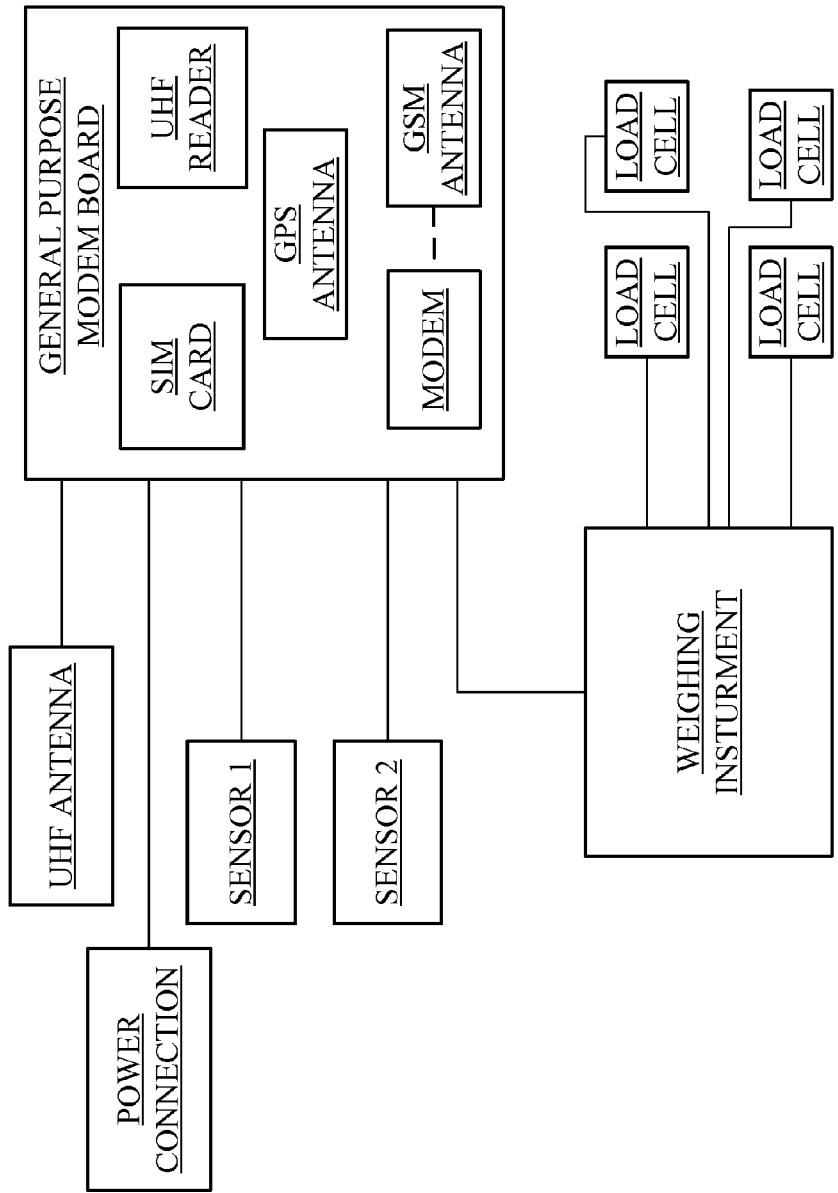
FIG. 13 represents an embodiment of a weighing system.

FIG. 13 illustrates one embodiment of the weighing system. In one embodiment, the weighing system includes two main elements housed in two enclosures: a control system that also handles communications and location functions and a weighing instrument. In this embodiment, the core of the system is the General Purpose Modem board (GPM2) as illustrated in FIG. 13. The GPM2 includes a modem with Global Positioning System (GPS) and Global Packet Radio Service (GPRS) capability and an ultra high frequency reader. In an alternative embodiment, a low frequency RFID system is utilized. The GPM2 receives input from at least one sensor and takes power and ignition input. In one embodiment, the sensor is adapted to sense movement. In another embodiment, the sensor is adapted to determine a change in weight. Any suitable sensor for determining the receipt of materials into the collection bin may be utilized by the weighing system. In another embodiment, the utilized sensors are standardized and fit easily to front loading waste collection vehicles, robotic arms, and/or collection bins.

In this embodiment, the second main element is the weighing instrument housed in a separate enclosure, such as in the collection bin 102. In one embodiment, the weighing instrument includes four load cells positioned under the collection bin 102 for taking weighing measurements that are transmitted by the GPM2 board. Referring to FIG. 14, which illustrates an exploded view of one embodiment of the collection bin, load cells are shown positioned underneath a tub 1402 on the frame 1404 of the collection bin.

In an embodiment, the ultra high frequency reader of the GPM2 is connected to an ultra high frequency antenna and at least one sensor for determining the start or end of the dumping of a waste container 114 into the collection bin 102. In an alternative embodiment, a low frequency reader of the GPM2 is connected to a low frequency antenna and at least one sensor for determining the start or end of the dumping of a waste container 114 into the collection bin 102

In another embodiment, the GPM2 board includes a Global System for Mobile communications (GSM) including a GSM antenna for receiving GSM frequency bands as further illustrated by FIG. 13. In yet another embodiment, the GPM2 board includes a subscriber identity module (SIM) card. The SIM card allows the GPM2 board to utilize GPRS and short message service (SMS or text). In one embodiment, voice mail should be disabled on the SIM card. Further, in one embodiment, the GPM2 board includes a power connection for receiving power from another component, such as the front loading WCV.

In an embodiment, the load cells take weight measurements at the start and the end of a dump cycle based on sensor information. In an embodiment, the determination of the correct time to take weight measurements is necessary for receiving accurate weight information. In another embodiment, the weighing system records and stores weight measurements every second. Further, during weighing, the amount of movement may be minimized for more accurate readings, such as through accurate sensor readings. In another embodiment, weight measurements taken at the start and end of a full dump cycle or the cycle of grabbing, emptying, and releasing of the waste container 114 are utilized to determine the amount of material collected from each waste container 114. In another embodiment, weights are calculated by measuring the weight of the collection bin prior to the start of the dump cycle and after the end of a full dump cycle to determine the amount of material collected from each waste container 114. In one embodiment, the measurements utilized were taken 1 second prior to the start of the dump cycle and 1 second after the end of the dump cycle. In another embodiment, the measurements utilized were taken 2 seconds prior to the start of the dump cycle and 2 seconds after the end of the dump cycle. In a further embodiment, the amount of time prior to the dump cycle that a measurement is taken is different from the amount of time the passes before measurement after a dump cycle is completed. The weight measurements can be taken at any period prior to or after the dump cycle.

In one embodiment, at least one sensor is placed on the robotic arm to determine the start and end of the dump cycle. In another embodiment, two sensors are placed on the robotic arm 106 to determine the start and end of the dump cycle. The first sensor is attached to the sliding part of the robotic arm 106. The second sensor is attached to the rotating part of the robotic arm 106. The first sensor determines the start and the end of a waste container 114 dump cycle. The second sensor determines the dumping of the waste container 114. These sensors have been shown in various experiments to accurately determine when to record weight measurements. These sensors can determine when to take weight measurements during regular and irregular dump cycles. For instance, the sensors have accurately determined when to record weight measurements if the robotic arm 106 slides out and back in without dumping, performs a normal dump cycle, performs an incomplete dump, performs a dump motion on an already emptied waste container 114, and performs a dump motion without holding a waste container 114.

In one embodiment, a third sensor is utilized. In an embodiment, the third sensor is located on the fork of the front loading waist collection vehicle. In this embodiment, the third sensor determines when the collection bin 102 is dumped into the hopper.

In another embodiment, the weighing system is calibrated before use. For example, the weighing system may undergo a zero and/or span calibration. A zero calibration may include ensuring that the weighing system is at zero when the collection bin 102 is empty and recalibrating the weighing system if not. A span calibration may include placing a known weight, such as 500 pounds, in the collection bin 102 to make sure the weighing system has the correct span. If the weighing system does not measure the correct weight, the weighing system can be calibrated for better accuracy. In a further embodiment, the calibration results are stored in permanent memory for use each time the weighing system is powered up.

The weighing system further comprises at least one computing device for weight determination and association. The logical operations of the various embodiments are implemented (1) as a sequence of computer implemented steps running on a computing system and/or (2) as interconnected machine modules within the computing system. The implementation is a matter of choice dependent on the performance requirements of the computing system implementing the disclosure. Accordingly, the logical operations making up the embodiments described herein are referred to alternatively as operations, steps or modules.

In one embodiment, each front loading WCV 101 comprises a computing device 1000. In another embodiment, each front loading WCV 101 sends collected data to a computing device 1000. In an alternative embodiment, a select number of front loading WCV 101 comprise a computing device 1000.

Figure 10:
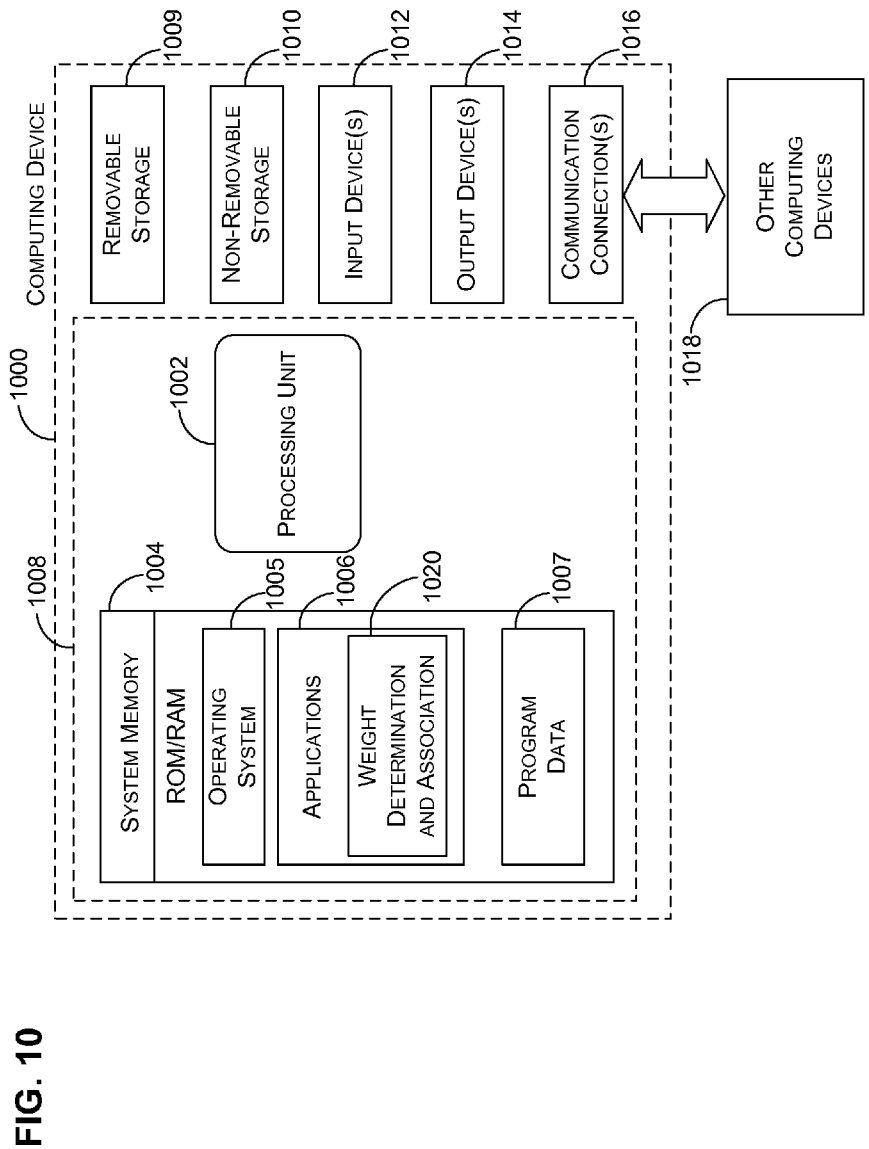
FIG. 10 represents an embodiment of a computing device adapted for use with a weighing system.

FIG. 10 represents an embodiment of a computing device 1000 for use in the weighing system. In a basic configuration, computing device 1000 may include any type of computing device including a vehicle-mounted or handheld mobile computing device. Computing device 1000 typically includes at least one processing unit 1002 and system memory 1004. Depending on the exact configuration and type of computing device, system memory 1004 may be volatile (such as RAM), non-volatile (such as ROM, flash memory, and the like) or some combination of the two. System memory 1004 typically includes operating system 1005, one or more executable programs or applications 1006, and may include program data 1007. In one embodiment, applications 1006 further include application 1020 for weight determination and association. This basic configuration is illustrated in FIG. 10 by those components within dashed line 1008.

Computing device 1000 may also have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Non-transitory Computer-readable storage media may include volatile and non-volatile, removable and non-removable media implemented in any method or technology for storage of information, such as non-transitory computer readable instructions, data structures, program modules or other data. System memory 1004, removable storage 1009 and non-removable storage 1010 are all examples of non-transitory computer-readable storage media. Non-transitory computer readable storage media include but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such non-transitory computer-readable storage medium may be part of computing device 1000. Computing device 1000 may also have an input device(s) 1012 such as a keyboard, mouse, pen, voice input device, touch input device, etc. Output device(s) 1014 such as a display, speakers, printer, etc. may also be included.

Computing device 1000 also contains communication connection(s) 1016 that allow the device to communicate with other computing devices 1018, such as over a network or a wireless network. Communication connection(s) 1016 is an example of communication media. Communication media typically embodies non-transitory computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media.

Figure 11:
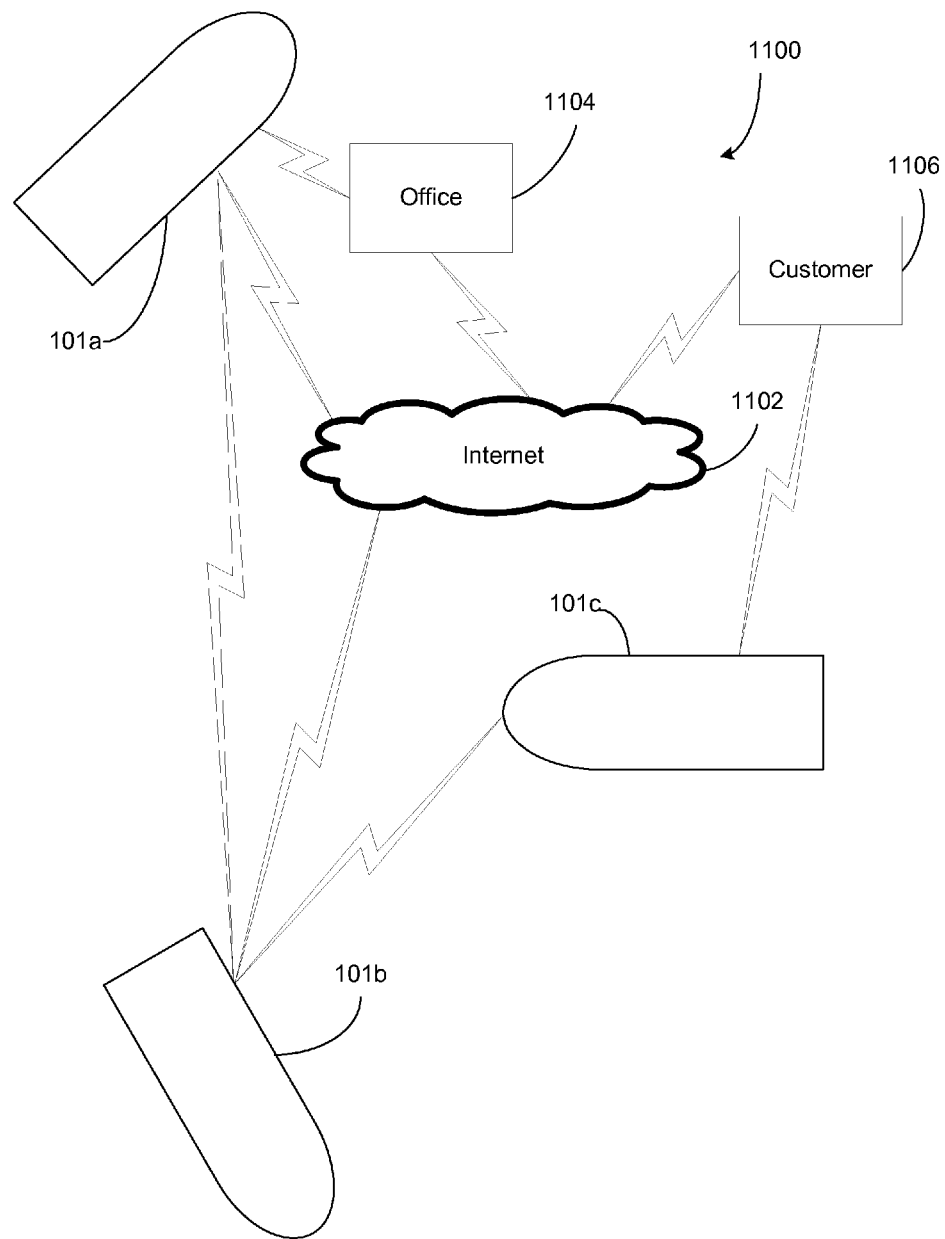
FIG. 11 represents embodiments of network overviews for a weighing system.

FIG. 11 represents one embodiment of network overviews for the weighing system. Network overview 1100 may include internet 1102, one or more front loading WCVs 101, an office 1104, and at least one customer 1106. Front loading WCVs 101a, 101b, and 101c are depicted herein as examples and are not limiting. In one aspect, front loading WCVs 101 are owned by one company. In an alternative embodiment, the front loading WCVs 101 are owned by several different companies that work together. In another embodiment, the front loading WCVs 101 may include any combination of network connectivity, scaling, and recorded data. For example, a front loading WCV 101 may be connected to the internet 1102 via wireless connectivity, such as GPRS over a general purpose modem. In another embodiment, two or more front loading WCVs 101 may be networked together to exchange information via the internet 1102, a radio frequency, and/or an infrared frequency. In one embodiment, a front loading WCV 101 may have no network connectivity, where features of the disclosure are locally facilitated. In other aspects, a front loading WCV 101 may use another front loading WCV 101 to network to the internet 1102 or another front loading WCV 101 in a mesh network manner. In a further embodiment, the front loading WCV 101 may be connected to the office 1104 or home computer system. In another embodiment, the front loading WCV 101 may communicate with customers 1106 directly. These and any of the other myriad of network possibilities may be included to facilitate weight determination and data utilization.

The weight determination and association application 1020 of the computer device 1000 receives weights from a scale or weighing instrument located on the collection bin and/or front loading waste collection vehicle 101. The weighing instrument, such as load cells, may be located inside of the collection bin, under the collection bin, inside the pockets of the collection bin and/or on the fork assembly.

In one embodiment, the weighing instrument is located on the collection bin. In another embodiment, the weighing instrument is located underneath the tub and on the frame of a collection bin. In this embodiment the load cells can be separate from and/or attached to the collection bin. Further, the weighing instrument once attached to the collection bin may be removable. In another embodiment, once the weighing instrument is attached to the collection bin, the weighing system cannot be separated from the collection bin.

In an alternative embodiment, the weighing instrument, such as at least one load cell, is located on the fork assembly. In this embodiment, the load cells can be separate from and/or attached to the fork assembly. Further, the weighing instrument once attached to the fork assembly may be removable. In another embodiment, once the weighing instrument is attached to the fork assembly, the weighing system cannot be separated from the fork assembly.

In one embodiment, the weighing system is self-contained on the collection bin. In another embodiment, the entire weighing system is separate from the collection bin and located on the front loading waste collection vehicle 101. In a further embodiment, the weighing system is located on both the collection bin and the front loading waste collection vehicle 101. In yet another embodiment, the entire weighing system may come with the collection bin and have portions that attached to the front loading waste collection vehicle 101 for installation and use of the weighing system.

Figure 3:
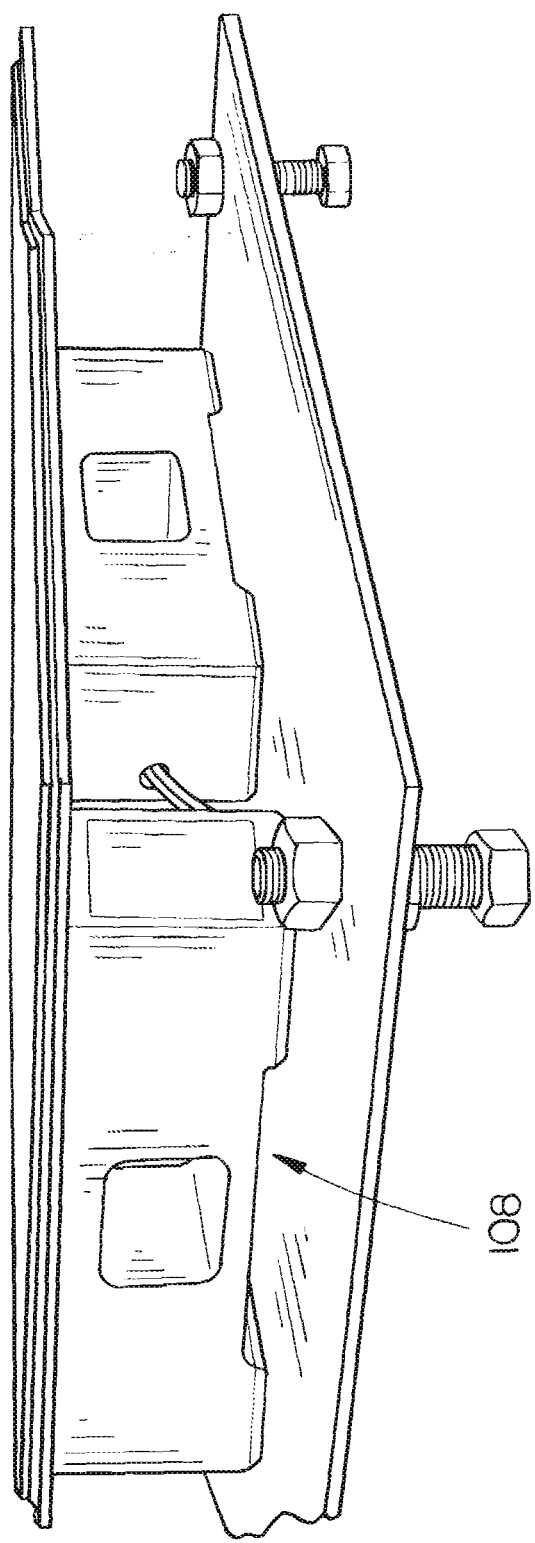
FIG. 3 is a perspective view of a scale of the collection and scale system of FIG. 1.

The weighing instrument may be any suitable device for weighing material, such as a load cell, strain gauge, and/or transducer. In one embodiment, the scale is inside of the collection bin and provides the interior floor of the bin. A scale suitable for being utilized inside of a collection bin is illustrated in FIG. 3. In one embodiment, the scale provides accurate weight measurements of within 5 pounds (2.268 kilograms) or less. In another embodiment, the scale provides accurate weight measurements of within 3 pounds (2.268 kilograms) or less. In a further embodiment, the scale provides accurate weight measurements of within 1 pound (2.268 kilograms) or less. In an additional embodiment, the scale provides accurate weight measurements of within 0.5 pounds (0.227 kilograms) or less. In another embodiment, the scale provides accurate weight measurements of within 0.1 pounds (0.0454 kilograms) or less.

The weighing instrument may be selectively activated or continuously active. The scale may continuously or selectively send weight to the weight determination and association application 1020. The weight determination and association application 1020 will account for any extra weight based on the varying configurations/locations of the scale. For instance, for scales located under the collection bin or on the fork assembly, the weight determination and association application 1020 will subtract the weight of the collection bin, robot arm, and any other weight not provided by the collected material from the measurements. In one embodiment, the weight determination and association application 1020 activates the scale and/or determines when the scale sends taken weights. In another embodiment, the scale is activated and/or sends weights based on triggers, such as sensor information. The weight determination and association (WDA) application 1020 associates each weight received with a specific identification. The identification may be entered by an operator or received from another device.

In one embodiment, the scale is triggered by the movement of the robotic arm 106. This same trigger after a certain time period may activate the scale to send new weight information to the WDA application 1020. In another embodiment, a trigger on the fork assembly may be utilized to reset the scale and/or the WDA application 1020 to provide for proper calculation. In an additional embodiment, the operator may be able to use a trigger that activates the scale to weigh and/or send new weight information to the WDA application 1020. Several of these triggers may further comprise timers that activate the scale to weigh or send new weight information after a determined amount of time. In one embodiment, the robotic arm may comprise a sensor, such as a mercury switch, tilt/angel sensor, inclinometer, and/or an accelerometer, for activating the scale or weighing instrument to weigh and/or to send new weight information. Any suitable mechanism or trigger for activating the scale to weigh and/or to send new weight information may be utilized by the WDA application 1020 to activate the scale to weigh and send out data without departing from the scope and intent of the disclosure.

Further, any weight information received by the WDA application 1020 is associated with a specific identification. The identification may include any necessary information for identifying the weight of the collected materials, such as date, time, route information, GPS location, the front loading WCV 101 utilized for collection, address, waste container number/information, and/or associated customer information.

The specific identification may be input by the operator or received from another device. The operator may input all information, a portion of the information, and/or even update the information. The device may provide a portion of the information, all of the information, and/or even update the information. The device may comprise a radio frequency identification system 200 (FIG. 4) and/or a global positioning system.

Figure 4:
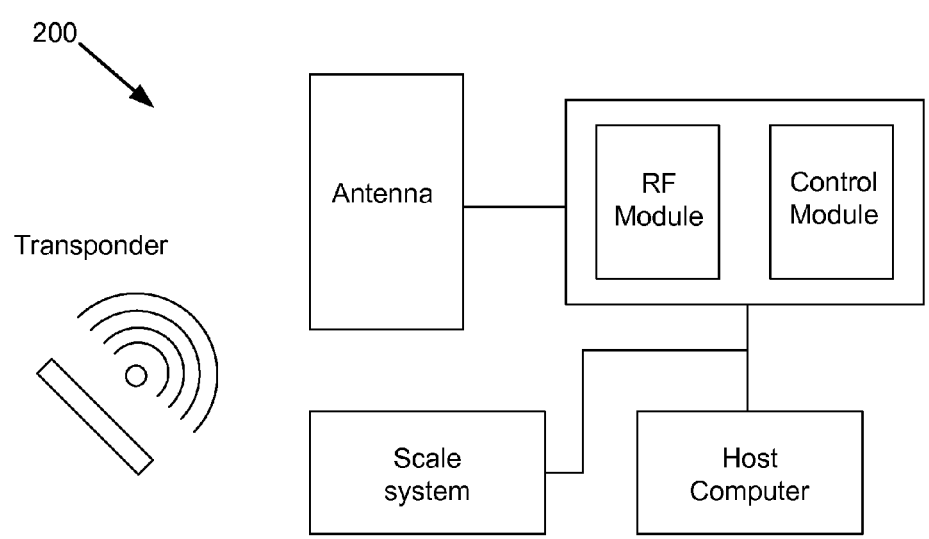
FIG. 4 is a diagram of a radio frequency identification system utilized with the collection and scale system of FIG. 1.
Figure 5B:
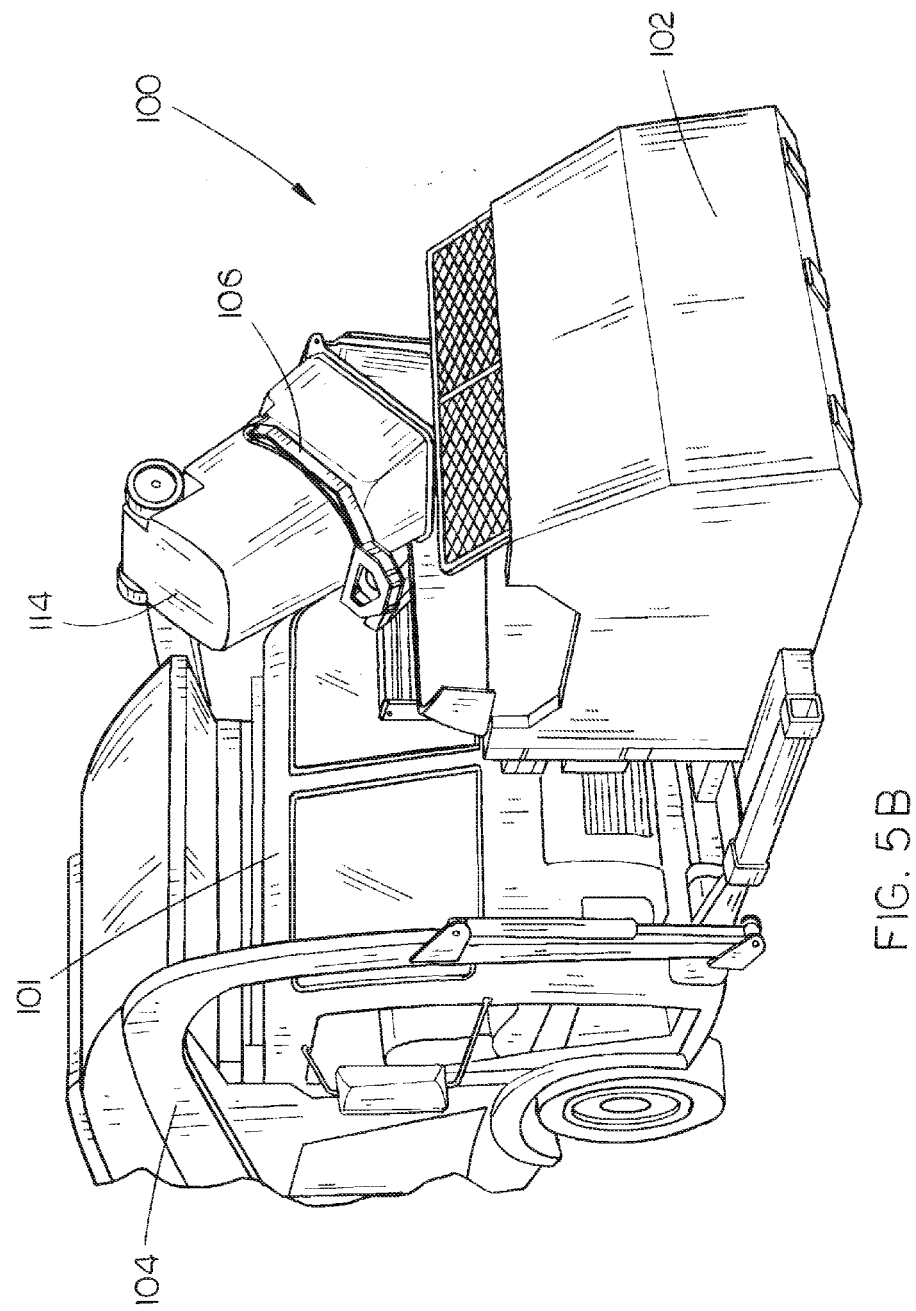
Figure 5C:
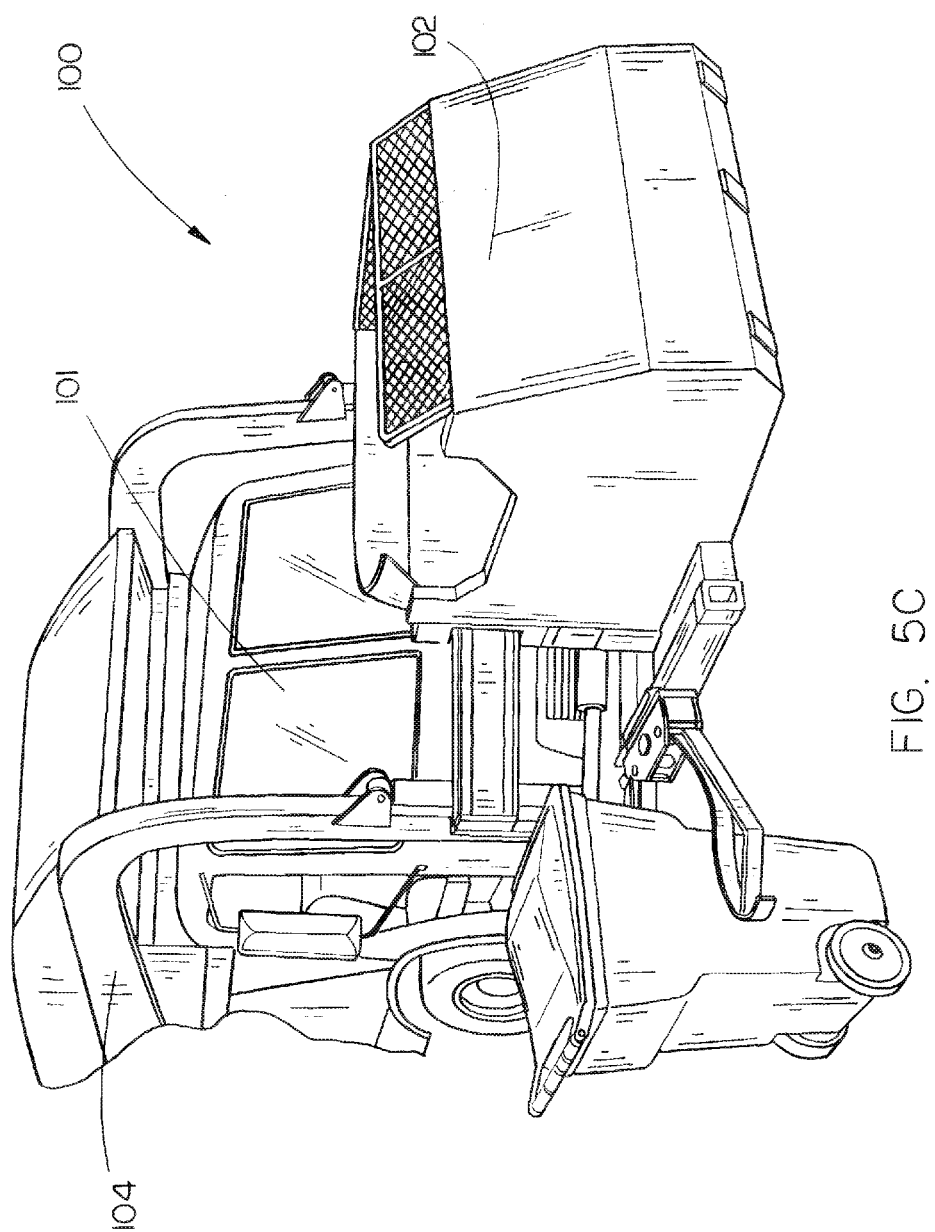
Figure 6:
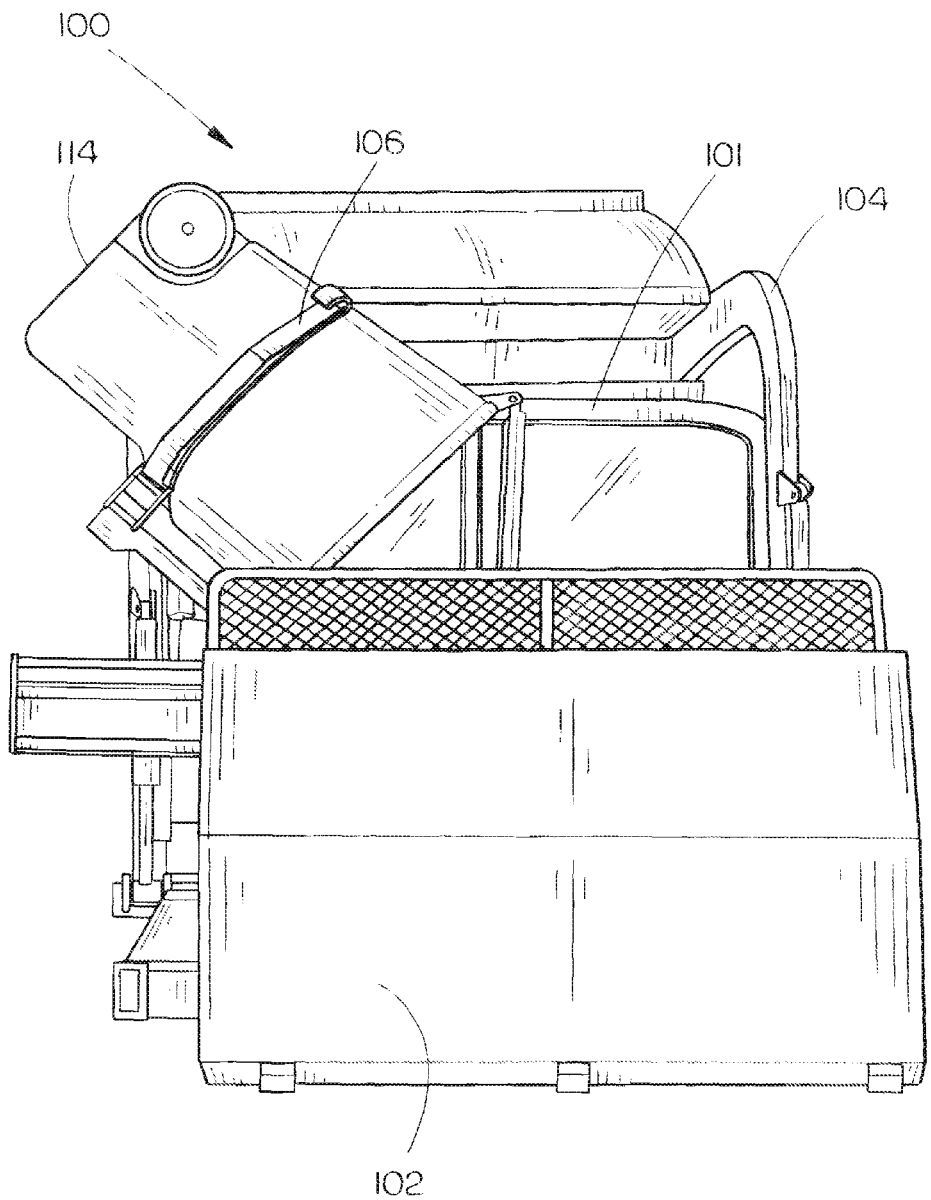
FIG. 6 is a front view of one embodiment of a collection and scale system showing the lifting and emptying of a waste container on a curb side of a collection bin according to the principles of the present disclosure.

A radio frequency tag or transponder may be associated or attached to one or more waste containers. The tag may include information relating to the customer, route, location, address, date, and/or material. An antenna located on the front loading WCV 101 may read the information and then associate the weight taken when closest to this transponder with the appropriate customer information. The transponder and the antenna may be located in any suitable place for allowing the identification to be properly associated with the proper weights of the collected materials by the WDA application 1020. In one embodiment, the information being associated with the taken weight may be displayed. An operator, in this embodiment, may be able to verify, update, or override the received RFID information to guarantee that the weight of the collected materials is associated with correct the information. One embodiment of an RFID system 200 is illustrated in FIG. 4.

The global positioning system may be utilized in a similar fashion to the RFID system 200 except that it utilizes microwave signals, satellites, and GPS receivers to determine location and/or perform the same function.

In one embodiment, the operator may have a button or method for recalculation. For instance, in a recyclables incentive program, the higher the weight of the recyclables the larger the incentive. Customers may inadvertently or purposely add extra non-recyclable materials to their waste container improperly increasing the weight of their collected recyclables. Because the operator can see if improper materials are added to the collection bin, the operator may remove these improper or undesirable items from the collection. In this embodiment, after the removal of these items, the operator can activate a recalculation. The recalculation deletes any improper weights taken and replaces the improper weight with the new correct weight. This embodiment allows the weighing system to maintain accurate readings after the removal of undesirable or improper materials.

Once the WDA application 1020 receives weight information and associates the weights with the proper information, the WDA application 1020 calculates other desired weights. In one embodiment, the WDA application 1020 may be programmed to determined several different weights and weight combinations. The WDA application 1020 may calculate the weight of the materials provided in each waste container or dumping, per customer, per household, per area, per route, per front loading WCV 101, in a select number of the front loading WCVs 101, per day, per month, or per year. The WDA application 1020 may determine the weight of materials provided per waste container or dump by calculating the weight prior to dumping the waste container, calculating the weight after dumping and then finding the difference between the two calculated weights. The recalculation can be triggered by any number of mechanisms. The recalculation may be triggered manually by an operator, by a switch on the robotic arm, a switch on the fork assembly, a GPS, and/or a radio frequency identification (RFID) system 200. Each calculation may be stored. Each calculation may be added into another calculation and stored. The calculations may be calculated by utilizing designed algorithms programmed into the computing device 1000.

Once the desired calculations have been obtained, these results can be stored or sent out. In one embodiment, the total collected material weight per customer may be sent to each customer and other parties. For instance, in a recycling incentive program the total collected weight of recyclables per customer may be sent to the customer and/or the company responsible for the incentives, so the customer and the program know the appropriate reward to be granted. In another embodiment, a state or city can reward whole communities for specific recycling habits with more funding if certain goals are met.

Figure 12:
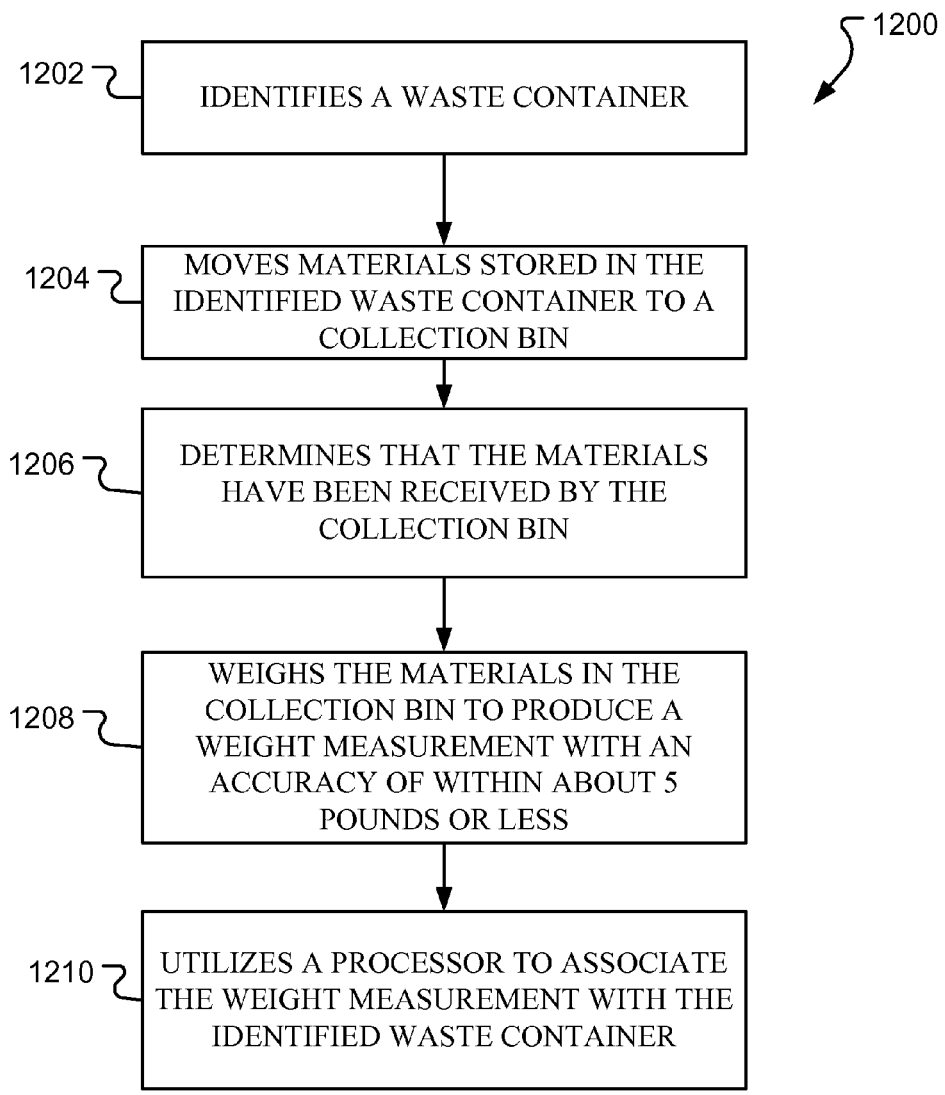
FIG. 12 illustrates an embodiment of a method for weighing materials in a collection bin for a front loading waste collection vehicle.

FIG. 12 represents an embodiment of a method for weighing materials collected in a collection bin for a front loading waste collection vehicle 1200. As illustrated, method 1200 identifies a waste container 1202. In one embodiment, method 1200 identifies the waste container manually. In another embodiment, method 1200 utilizes and RFID system to identify the waste container. The front loading WCV may contain the RFID antenna and the waste container an RFID tag that is recognized by the antenna. The RFID tag may contain numerous information, such as owner name, owner address, waste container size, waste container number, and/or owner account number or may be an identifier that can be used to access such information from a database. In another embodiment, the location of the waste container is determined utilizing GPS. The location of the waste container and/or the front loading WCV may be stored and/or determined along with the other identifying information of the waste container.

As illustrated in FIG. 12, method 1200 moves materials stored in the identified waste container to a collection bin 1204. In one embodiment, the materials in the identified waste container may be manually placed into the collection. In another embodiment, the materials contained in the waste container are automatically moved into the collection bin. In one embodiment, an automated robotic arm is utilized to automatically move materials stored in a waste container to the collection bin.

Further, method 1200 determines that the materials have been received by the collection bin 1206. In one embodiment, method 1200 manually determines the materials have been received by the collection bin. In another embodiment, method 1200 utilizes a sensor to determine that the materials have been received by the collection bin. Any suitable sensor for determining movement or weight change may be utilized by method 1200. In one embodiment, a sensor is located on the sliding part of an automated robotic arm. In a further embodiment, a sensor is located on the rotating part of the robotic arm. In another embodiment, a sensor is located on the fork of the front loading WCV. In an alternative embodiment, the operator visually determines that the material from the waste container is received by the collection bin.

Method 1200 weighs the materials in the collection bin to produce a weight measurement with an accuracy of within about 5 pounds or less 1208. In one embodiment, method 1200 utilizes a load cell to determine the weight of the materials in the collection bin. In one embodiment, the weight measurement taken by method 1200 is within at least one about 1 pound or less, about 0.5 pounds or less, and about 0.1 pounds or less of the weight of the collected materials. In a further embodiment, method 1200 utilizes the weight of the collection bin prior to receiving materials from a waste container and the weight of the collection bin after the step of determining that materials from the waste container have been received by the collection bin to generate the weight measurement of the materials found within the waste container.

Additionally, method 1200 utilizes a processor to associate the weight measurement with the identified waste container 1210. In yet another embodiment, method 1200 stores the weight measurement in association with the identified waste container. In another embodiment, method 1200 associates and stores other data associated with waste container with the weight measurement.

In one embodiment, method 1200 utilizes a computer device and/or processor to calculate the weight measurement and to associate the weight measurement and/or other waste container related data with the identified waste container. Further, the computing device may further include a storage media for the grouped data. In one embodiment, the computing device also contains communication connection(s) that allow the device to communicate with other computing devices, such as over a network or a wireless network. By way of example, and not limitation, the communication media of the computing device may include wired media such as a wired network or direct-wired connection, and wireless media such as acoustic, RF, infrared and other wireless media.

In another embodiment, method 1200 may group and add related weights and information stored in association with identified waste container for larger system analysis. For instance, the weights of the materials collected by one front loading WCV may be determined by method 1200. In one example, the material collected for an entire geographic area may be calculated. In another embodiment, the time necessary for collecting material from a geographic area is calculated. In a further embodiment, the average weight of materials collected from one or multiple geographic areas may be calculated.

In another embodiment, method 1200 displays the weight measurement with the identified waste container and/or any other related appropriate information. In another embodiment, method 1200 displays calculations made by the grouping of related data. In one embodiment, the information is displayed on a monitor attached to the front loading waste collection vehicle. In another embodiment, the information is displayed on a monitor separate from the front loading waste collection vehicle, such as a personal computer or smart phone.

In an additional embodiment, method 1200 identifies an undesirable object in the collection bin, removes the undesirable object from the collection bin, and recalculates the weight measurement after the removal of the undesirable object. An "undesirable object" as used herein is any object that should not be or was not intended to be collected and stored in the hopper of the front loading waste collection vehicle. In one embodiment, the operator in the cab of the WCV sees the material as it is dumped into the collection bin. The operator may see undesirable objects in the collection bin and identify them as undesirable objects. In one embodiment, these objects are manually removed from the collection bin. After the removal of the undesirable object, the operator can command the weighing system to recalculate the weight measurement removing the weight of the undesirable object.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described, various changes and modifications may be made which are well within the scope of the present disclosure. For example, any number of sensors, computers, robotic arms, and/or weighing systems may be utilized, Numerous other changes may be made which will readily suggest themselves to those skilled in the art and which are encompassed in the spirit of the disclosure and as defined in the appended claims.

What is claimed is:

1. A collection bin comprising:
   at least one pocket for receiving at least one fork of a fork assembly of a front loading waste collection vehicle;
   a processor, and
   a weighing instrument controlled by the processor, the weighing instrument is adapted to weigh material disposed in the collection bin to produce weight measurements,
   wherein the processor associates the weight measurements with appropriate data; and
   an automated robotic arm attached to the collection bin, the automated robotic arm is adapted to empty material contained in a waste container into the collection bin.

2. A collection bin comprising:
   at least one pocket for receiving at least one fork of a fork assembly of a front loading waste collection vehicle;
   a processor,
   a weighing instrument controlled by the processor, the weighing instrument is adapted to weigh material disposed in the collection bin to produce weight measurements,
   wherein the processor associates the weight measurements with appropriate data; and
   a frame, the frame comprising the at least one pocket; and
   a tub, the tub held by the frame,
   wherein the weighing instrument is at least one load cell, the at least one load cell attached to the frame underneath the tub.

3. The collection bin of claim 2, wherein the weighing instrument provides for an accuracy of at least one of within about 5 pounds or less.

4. The collection bin of claim 2, further comprising:
   an RFID system controlled by the processor and adapted to at least identify waste containers; and
   a GPS system controlled by the processor and adapted to determine a location of at least one of the collection bin and waste containers.

5. The collection bin of claim 2, wherein the appropriate data includes at least one of a time a waste container is emptied into the collection bin, a date a waste container is emptied into the collection bin, a location of a waste container, a location of a waste container when emptied into the collection bin, an owner of a waste container, owner information for a waste container, waste container size, and previously taken weight measurements.

6. The collection bin of claim 2, wherein the weighing instrument is self-contained.

7. The collection bin of claim 2, further comprising at least one sensor in communication with the processor, the at least one sensor is adapted to determine at least one of movement or weight change.

8. The collection bin of claim 2, further comprising a GPRS system controlled by the processor.

9. The collection bin of claim 2, further comprising a GSM antenna controlled by the processor and a SIM card.

10. The collection bin of claim 2, further comprising a display controlled by the processor and an input device.

11. The collection bin of claim 2, further comprising a communication connection connected to the processor.

12. The collection bin of claim 2, wherein the processor further comprises a weight determination and association application controlled by the processor.

13. A collection and scale system, comprising:
    a front loading waste collection vehicle; and
    a collection bin, the collection bin comprising at least one pocket for receiving at least one fork of a fork assembly of the front loading waste collection vehicle, and
    a weighing system, the weighing system is adapted to weigh material disposed in the collection bin to produce weight measurements and comprises
    at least one weighing instrument, and
    a processor,
    wherein the processor associates the weight measurements with appropriate data,
    wherein the weighing instrument is attached to the collection bin.

14. A collection and scale system, comprising:
    a front loading waste collection vehicle; and
    a collection bin, the collection bin comprising at least one pocket for receiving at least one fork of a fork assembly of the front loading waste collection vehicle, and
    a weighing system, the weighing system is adapted to weigh material disposed in the collection bin to produce weight measurements and comprises
    at least one weighing instrument, and
    a processor,
    wherein the processor associates the weight measurements with appropriate data,
    wherein the weighing system is self-contained on the collection bin.

15. A collection and scale system, comprising:
    a front loading waste collection vehicle; and
    a collection bin, the collection bin comprising at least one pocket for receiving at least one fork of a fork assembly of the front loading waste collection vehicle, and
    a weighing system, the weighing system is adapted to weigh material disposed in the collection bin to produce weight measurements and comprises
    at least one weighing instrument, and
    a processor,
    wherein the processor associates the weight measurements with appropriate data,
    wherein a portion of the weighing system is located on the front loading waste collection vehicle and a portion is located on the collection bin.

16. The collection bin of claim 2, wherein the weighing instrument provides for an accuracy of at least within about 1 pound or less.

17. The collection bin of claim 2, wherein the weighing instrument provides for an accuracy of at least within about 0.5 pounds or less.

18. The collection bin of claim 2, wherein the weighing instrument provides for an accuracy of at least within about 0.1 pounds or less.

* * * * *